(12) United States Patent
Morley et al.

(10) Patent No.: US 8,193,257 B2
(45) Date of Patent: Jun. 5, 2012

(54) AMINE-INITIATED POLYOLS AND RIGID POLYURETHANE FOAM MADE THEREFROM

(75) Inventors: Timothy A. Morley, Horgen (CH); Francois M. Casati, Pfaffikon (CH); Adrian J. Birch, Horgen (CH); David A. Babb, Lake Jackson, TX (US); Charles A. Martin, II, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 243 days.

(21) Appl. No.: 12/524,351

(22) PCT Filed: Dec. 11, 2007

(86) PCT No.: PCT/US2007/025300
§ 371 (c)(1),
(2), (4) Date: Jul. 23, 2009

(87) PCT Pub. No.: WO2008/094239
PCT Pub. Date: Aug. 7, 2008

(65) Prior Publication Data
US 2010/0036010 A1    Feb. 11, 2010

Related U.S. Application Data

(60) Provisional application No. 60/898,367, filed on Jan. 30, 2007.

(51) Int. Cl.
*C08G 18/00* (2006.01)
(52) U.S. Cl. .............. 521/174; 521/155; 521/170
(58) Field of Classification Search .......... 521/174, 521/155, 170; 568/606
See application file for complete search history.

(56) References Cited

U.S. PATENT DOCUMENTS

| | | | | |
|---|---|---|---|---|
| 4,046,729 | A | * | 9/1977 | Scriven et al. ............ 524/589 |
| 4,048,102 | A | * | 9/1977 | Quock et al. ............. 521/131 |
| 4,153,768 | A | * | 5/1979 | Blount ................... 521/155 |
| 4,595,743 | A | | 6/1986 | Laughner |
| 4,703,100 | A | * | 10/1987 | Rasshofer et al. ........... 528/66 |
| 4,764,543 | A | * | 8/1988 | Savina .................. 521/160 |
| 5,114,988 | A | | 5/1992 | Gagnon |
| 5,306,735 | A | * | 4/1994 | Harada et al. ............. 521/78 |
| 5,315,041 | A | * | 5/1994 | Abe et al. .............. 564/506 |
| 5,461,084 | A | | 10/1995 | Doerge |
| 6,423,756 | B1 | * | 7/2002 | Ghobary et al. ........... 521/128 |
| 7,893,124 | B2 | * | 2/2011 | Emge et al. ............. 521/167 |
| 2004/0259967 | A1 | * | 12/2004 | Neill et al. .............. 521/99 |
| 2006/0169948 | A1 | * | 8/2006 | Neill et al. ............ 252/182.24 |
| 2007/0142601 | A1 | * | 6/2007 | Nodelman et al. .......... 528/44 |
| 2007/0142607 | A1 | * | 6/2007 | Harasin et al. ........... 528/44 |
| 2007/0142610 | A1 | * | 6/2007 | Harasin et al. ........... 528/73 |
| 2008/0269367 | A1 | * | 10/2008 | Neill et al. ............. 521/137 |

FOREIGN PATENT DOCUMENTS

| | | |
|---|---|---|
| EP | 0480583 A | 4/1992 |
| WO | 03/089505 A | 10/2003 |
| WO | WO-2006037540 A2 * | 4/2006 |
| WO | 2008/094963 A | 8/2008 |

* cited by examiner

*Primary Examiner* — Mark Eashoo
*Assistant Examiner* — Melissa Rioja
(74) *Attorney, Agent, or Firm* — Gary C Cohn PLLC

(57) ABSTRACT

Polyether polyols are initiated with aminocyclohexanealkylamines such as isophoronediamine and 1,8-diaminop-menthane. The polyols are useful in making rigid polyurethane foams, especially foams for pour-in-place applications, where they give a good combination of low k-factor and short demold times.

6 Claims, No Drawings

AMINE-INITIATED POLYOLS AND RIGID POLYURETHANE FOAM MADE THEREFROM

This application claims benefit of U.S. Provisional Application No. 60/898,367, filed 30 Jan. 2007.

This invention pertains to polyols that are useful for manufacturing rigid polyurethane foams, as well as rigid foams made from those polyols.

Rigid polyurethane foams have been used widely for several decades as insulation foam in appliances and other applications, as well as a variety of other uses. These foams are prepared in a reaction of a polyisocyanate and one or more polyol, polyamine or aminoalcohol compounds. The polyol, polyamine or aminoalcohols compounds can be characterized as having equivalent weights per isocyanate-reactive group in the range of up to about 300 and an average of more than three hydroxyl and/or amino groups per molecule. The reaction is conducted in the presence of a blowing agent which generates a gas as the reaction proceeds. The gas expands the reacting mixture and imparts a cellular structure.

Originally, the blowing agent of choice was a "hard" chlorofluorocarbon (CFC) such as trichlorofluoromethane or dichlorodifluoromethane. These CFCs processed very easily and produced foam having very good thermal insulation properties. However, the CFC blowing agents have been phased out because of environmental concerns.

CFCs have been replaced with other blowing agents such as hydrofluorocarbons, low-boiling hydrocarbons, hydrochlorofluorocarbons, ether compounds, and water (which reacts with isocyanates to generate carbon dioxide). For the most part, these alternative blowing agents are less effective thermal insulators than their CFC predecessors. The ability of a foam to provide thermal insulation is often expressed in terms of "k-factor", which is a measure of the amount of heat that is transferred through the foam per unit area per unit time, taking into account the thickness of the foam and the applied temperature difference across the foam thickness. Foams produced using alternative blowing agents tend to have higher k-factors than those produced using "hard" CFC blowing agents. This has forced rigid foam producers to modify their foam formulations in other ways to compensate for the loss of thermal insulation values that result from the changes in blowing agent. Many of these modifications focus on reducing cell size in the foam. Smaller-sized cells tend to provide better thermal insulation properties.

It has been found that modifications to a rigid foam formulation which improve k-factor tend to affect the processing characteristics of the formulation in an undesirable way. The curing characteristics of the formulation are important, especially in pour-in-place applications such as appliance foam. Refrigerator and freezer cabinets, for example, are usually insulated by partially assembling an exterior shell and interior liner, and holding them in position such that a cavity is formed between them. This is often done using a jig or other apparatus. The foam formulation is introduced into the cavity, where it expands to fill the cavity. The foam provides thermal insulation and imparts structural strength to the assembly. The way the foam formulation cures is important in at least two respects. First, the foam formulation must cure quickly to form a dimensionally stable foam, so that the finished cabinet can be removed from the jig. This characteristic is generally referred to as "demold" time, and directly affects the rate at which cabinets can be produced.

In addition, the curing characteristics of the system affect a property known as "flow index" or simply "flow". A foam formulation will expand to a certain density (known as the 'free rise density') if permitted to expand against minimal constraints. When the formulation must fill a refrigerator or freezer cabinet, its expansion is somewhat constrained in several ways. The foam must expand mainly in a vertical (rather than horizontal) direction within a narrow cavity. As a result, the formulation must expand against a significant amount of its own weight. The foam formulation also must flow around corners and into all portions of the wall cavities. In addition, the cavity often has limited or no venting, and so the atmosphere in the cavity exerts additional pressure on the expanding foam. Because of these constraints, a greater amount of the foam formulation is needed to fill the cavity than would be predicted from the free rise density alone. The amount of foam formulation needed to minimally fill the cavity can be expressed as a minimum fill density (the weight of the formulation divided by the cavity volume). The ratio of the minimum fill density to the free rise density is the flow index. The flow index is ideally 1.0, but is on the order of 1.2 to 1.8 in commercially practical formulations. Lower flow index is preferred, all other things being equal, because raw materials costs are lower when a smaller weight of foam is needed.

Modifications to foam formulations that favor low k-factor tend to have an adverse effect on demold time, flow index or both. Therefore, although formulations have been developed which closely match conventional CFC-based formulations in k-factor, the overall cost of using these formulations is often higher due to lower productivity (because of greater demold times), higher raw material costs (because of higher flow index) or both.

What is desired is a rigid foam formulation that provides a low k-factor foam with a low flow index and a short demold time.

This invention is in one aspect an amine-initiated polyol having an average hydroxyl functionality of greater than 3.0 up to 4.0, the polyol being a reaction product of at least one $C_2$-$C_4$ alkylene oxide with an aminocyclohexanealkylamine initiator compound.

The invention is also a process for preparing a rigid polyurethane foam, comprising a) forming a reactive mixture containing at least 1) an aminocyclohexanealkylamine-initiated polyol according to the first aspect of the invention having a hydroxyl equivalent weight of from 75 to 560, or mixture thereof with at least one other polyol, provided that such a mixture contains at least 5% by weight of the aminocyclohexanealkylamine-initiated polyol of the first aspect;

2) at least one hydrocarbon, hydrofluorocarbon, hydrochlorofluorocarbon, fluorocarbon, dialkyl ether or fluorine-substituted dialkyl ether physical blowing agent; and 3) at least one polyisocyanate; and b) subjecting the reactive mixture to conditions such that the reactive mixture expands and cures to form a rigid polyurethane foam.

In another aspect, the invention is a rigid foam made in accordance with the foregoing process.

It has been found that rigid foam formulations that include the polyol of the invention often exhibit desirable curing characteristics (as indicated by flow index of below 1.8) and short demold times, and cure to form a foam having excellent thermal insulation properties (i.e., low k-factor). These advantages are seen particularly when the amine-initiated polyol of the invention is used in an admixture that contains one or more other polyols that have a hydroxyl functionality of from 4 to 8 and a hydroxyl equivalent weight from 75 to 200.

The amine-initiated polyol is a polyether that is prepared from at least one aminocyclohexanealkylamine initiator compound. For purposes of this invention, an "aminocyclohexanealkylamine" initiator compound is one having a cyclohexane group that is substituted on the cyclohexane ring with a primary amino (—$NH_2$) group, and which is also substituted on the cyclohexane group with at least one, and preferably only one, aminoalkyl group. The aminoalkyl group can be represented as —(CR$_2$)$_m$—NH$_2$, wherein each R is independently hydrogen or C$_1$-C$_4$ alkyl and m is a number from 1 to 8. Each R is preferably independently hydrogen or methyl. The primary amino group and the aminoalkyl group(s) can be in the ortho, meta or para positions with respect to each other, and may be in the cis- (both on the same side of the ring) or trans- (located on opposite sides of the ring) positions with respect to each other. The cyclohexane ring may also contain inert substitution. "Inert" substitution is substitution that (1) is not reactive with an alkylene oxide under the conditions of alkoxylation (as described more below), (2) is not reactive with isocyanate groups and (3) does not significantly affect the ability of the aminocyclohexanealkylamine compound to become alkoxylated and of the resulting polyol to react with a polyisocyanate to form urethane linkages. Inert substitution includes hydrocarbyl substitution such as alkyl, alkenyl, alkynylaryl, aryl-substituted alkyl, cycloalkyl and the like, ether groups, tertiary amino groups, and the like. It is preferred that any substituent groups that may be present are C$_1$-C$_4$ alkyl, especially methyl. It is especially preferred that the cyclohexane ring is methyl-substituted at the carbon atom to which the amino group is bonded.

Mixtures of two or initiator compounds as just described can be used. Initiators of the foregoing structure may exist in two or more diastereoisomeric forms. In such cases, any of the diastereoisomeric forms, or mixtures of any two or more of the diastereoisomeric forms, can be used.

One class of aminocyclohexanealkylamine compounds includes those represented by structure I:

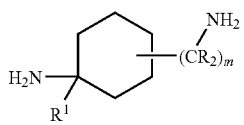

(I)

wherein R$^1$ is C$_1$-C$_4$ alkyl, and R and m are as defined before. Each R group in structure I is preferably independently hydrogen or methyl, and R$^1$ is preferably methyl. In structure I, the —(CR$_2$)$_m$—NH$_2$ group may be ortho, meta or para to the amino group bonded directly to the cyclohexane ring. The —NH$_2$ and —(CR$_2$)$_m$—NH$_2$ groups in structure I may be in the cis- or trans-positions with respect to each other. In structure I, the cyclohexane carbon atoms may contain inert substituent groups in addition to the —NH$_2$, —R$^1$ and —(CR$_2$)$_m$—NH$_2$ groups shown. A preferred initiator compound corresponding to structure I is cyclohexanemethanamine, 4-amino-α,α,4-trimethyl-(9Cl), which is also known as p-menthane-1,8-diamine or 1,8-diamino-p-menthane. This compound exists in two diastereoisomeric forms, as follows:

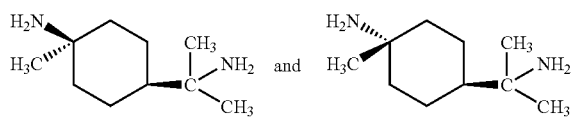

Either of the diastereoisomeric forms, or a mixture of both, can be used.

A second type of aminocyclhexanealkylamine initiator corresponds to structure II:

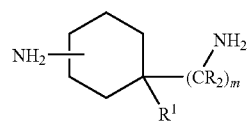

(II)

in which R, R$_1$ and m are as defined before. As in structure I, each R group in structure II is preferably independently hydrogen or methyl and R$^1$ is preferably methyl. In structure II, the —(CR$_2$)$_m$—NH$_2$ group may be ortho, meta or para to the amino group bonded directly to the cyclohexane ring. The —NH$_2$ and —(CR$_2$)$_m$—NH$_2$ groups in structure II may be in the cis- or trans-positions with respect to each other. In structure II, the cyclohexane carbon atoms may contain inert substituent groups in addition to the —NH$_2$, —R$^1$ and —(CR$_2$)$_m$—NH$_2$ groups shown. An especially preferred initiator compound that corresponds to structure II is 5-amino-1,3,3-trimethylcyclohexanemethylamine, which is commonly known as isophoronediamine. Isophoronediamine also exists in two diastereoisomeric forms, as follows:

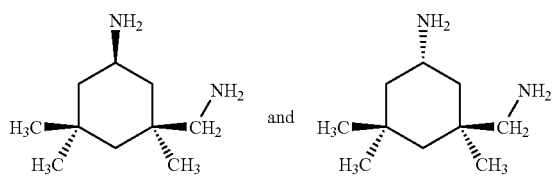

Again, either of these forms or a mixture thereof can be used.

Commercially available aminocyclohexanealkylamine compounds tend to contain small amounts (typically less than 3% by weight) of impurities, which tend to be mainly other amine or diamine compounds. These commercially materials are suitable as initiators in the present invention.

The initiator compound is caused to react with at least one C$_2$-C$_4$ alkylene oxide to produce the amine-initiated polyol of the invention. The alkylene oxide may be ethylene oxide, propylene oxide, 1,2- or 2,3-butylene oxide, tetramethylene oxide or a combination of two or more thereof. If two or more alkylene-oxides are used, they may be added to the initiator compound simultaneously (to form a random copolymer) or sequentially (to form a block copolymer). Butylene oxide and tetramethylene oxide are generally less preferred. Ethylene oxide, propylene oxide and mixtures thereof are more preferred. Mixtures of ethylene oxide and propylene oxide may contain the oxides in any proportion. For example, a mixture of ethylene oxide and propylene oxide may contain from 10 to 90 weight percent of ethylene oxide, preferably from 30 to 70 weight percent ethylene oxide or from 40 to 60 weight percent ethylene oxide.

Enough of the alkylene oxide(s) are added to the initiator to produce a polyol having an average hydroxyl functionality of greater than 3.0, up to as many as 4.0 hydroxyl groups/molecule. A preferred average hydroxyl functionality for the polyol is from 3.3 to 4.0, and a more preferred average hydroxyl functionality is from 3.7 to 4.0. A polyol of the invention that is useful for preparing rigid polyurethane foam suitably has a hydroxyl equivalent weight of from 75 to 560. A preferred hydroxyl equivalent weight for rigid foam production is from 90 to 175 and a more preferred hydroxyl equivalent weight for rigid foam production is from 100 to 130.

The alkoxylation reaction is conveniently performed by forming a mixture of the alkylene oxide(s) and the initiator compound, and subjecting the mixture to conditions of elevated temperature and superatmospheric pressure. Polymerization temperatures may be, for example, from 110 to 170° C., and pressures may be, for example, from 2 to 10 bar (200 to 1000 kPa). A catalyst may be used, particularly if more than one mole of alkylene oxide(s) is to be added per equivalent of amine hydrogen on the initiator compound. Suitable alkoxylation catalysts include strong bases such as alkali metal hydroxides (sodium hydroxide, potassium hydroxide, cesium hydroxide, for example), as well as the so-called double metal cyanide catalysts (of which zinc hexacyanocobaltate complexes are most notable). The reaction can be performed in two or more stages, in which no catalyst is used in the first stage, and from 0.5 to 1.0 mole of alkylene oxide is added to the initiator per equivalent of amine hydrogens, followed by one or more subsequent stages in which additional alkylene oxide is added in the presence of a catalyst as described. After the reaction is completed, the catalyst may be deactivated and/or removed. Alkali metal hydroxide catalysts may be removed, left in the product, or neutralized with an acid and the residues left in the product. Residues of double metal cyanide catalysts may be left in the product, but can be removed instead if desired.

Preferred amine-initiated polyols are (a) the reaction product of isophorone diamine or 1,8-diamino-p-menthane with ethylene oxide, (b) the reaction product of isophorone diamine or 1,8-diamino-p-menthane with propylene oxide and (c) the reaction product of isophorone diamine or 1,8-diamino-p-menthane with a mixture of from 30 to 70 mole percent ethylene oxide and 70 to 30 mole percent propylene oxide, in each case having a hydroxyl functionality of from 3.3 to 4.0, especially 3.7 to 4.0 and a hydroxyl equivalent weight of from 90 to 175, especially from 100 to 130.

The amine-initiated polyol of the invention is useful in preparing rigid polyurethane foam, particularly when its hydroxyl equivalent weight is from 75 to 560. The rigid polyurethane foam is prepared from a polyurethane-forming composition that contains at least (1) the amine-initiated polyol, optionally in combination with one or more other polyols, (2) at least one organic polyisocyanate, and (3) at least one physical blowing agent as described more fully below.

The amine-initiated polyol of the invention suitably constitutes at least 5 weight percent of all polyols present in the polyurethane-forming composition. Below this level, the benefits of using the polyol are slight. The amine-initiated polyol of the invention may be the sole polyol in the polyurethane-forming composition. However, it is anticipated that in most cases, it will be used in a mixture containing at least one other polyol, and that the amine-initiated polyol of the invention will constitute from about 5 to about 75% by weight of the polyol mixture. For example, the amine-initiated polyol of the invention may constitute from 10 to about 60% by weight of the polyol mixture, or from about 10 to about 50% by weight of the polyol mixture.

When a mixture of polyols is used, the polyol mixture preferably has an average of 3.5 to about 7 hydroxyl groups/molecule and an average hydroxyl equivalent weight of about 90 to about 175. Any individual polyol within the mixture may have a functionality and/or equivalent weight outside of those ranges, if the mixture meets these parameters. Water is not considered in determining the functionality or equivalent weight of a polyol mixture.

A more preferred average hydroxyl functionality for a polyol mixture is from about 3.8 to about 6 hydroxyl groups/molecule. An even more preferred average hydroxyl functionality for a polyol mixture is from about 3.8 to about 5 hydroxyl groups/molecule. A more preferred average hydroxyl equivalent weight for a polyol mixture is from about 110 to about 130.

Suitable polyols that can be used in conjunction with the amine-initiated polyol of the invention include polyether polyols, which are conveniently made by polymerizing an alkylene oxide onto an initiator compound (or mixture of initiator compounds) that has multiple active hydrogen atoms. The initiator compound(s) may include alkylene glycols (e.g., ethylene glycol, propylene glycol, 1,4-butane diol, 1,6-hexanediol and the like), glycol ethers (such as diethylene glycol, triethylene glycol, dipropylene glycol, tripropylene glycol and the like), glycerine, trimethylolpropane, pentaerythritol, sorbitol, sucrose, glucose, fructose or other sugars, and the like. A portion of the initiator compound may be one containing primary and/or secondary amino groups, such as ethylene diamine, hexamethylene diamine, diethanolamine, monoethanolamine, N-methyldiethanolamine, piperazine, aminoethylpiperazine, diisopropanolamine, monoisopropanolamine, methanolamine, dimethanolamine, toluene diamine (all isomers) and the like. Amine-initiated polyols of these types tend to be somewhat autocatalytic. The alkylene oxides used to make the additional polyol(s) are as described before with respect to the amine-initiated polyol of the invention. The alkylene oxide of choice is propylene oxide, or a mixture of propylene oxide and ethylene oxide.

Polyester polyols may also be used as an additional polyol, but are generally less preferred as they tend to have lower functionalities. The polyester polyols include reaction products of polyols, preferably diols, with polycarboxylic acids or their anhydrides, preferably dicarboxylic acids or dicarboxylic acid anhydrides. The polycarboxylic acids or anhydrides may be aliphatic, cycloaliphatic, aromatic and/or heterocyclic and may be substituted, such as with halogen atoms. The polycarboxylic acids may be unsaturated. Examples of these polycarboxylic acids include succinic acid, adipic acid, terephthalic acid, isophthalic acid, trimellitic anhydride, phthalic anhydride, maleic acid, maleic acid anhydride and fumaric acid. The polyols used in making the polyester polyols include ethylene glycol, 1,2- and 1,3-propylene glycol, 1,4- and 2,3-butane diol, 1,6-hexane diol, 1,8-octane diol, neopentyl glycol, cyclohexane dimethanol, 2-methyl-1,3-propane diol, glycerine, trimethylol propane, 1,2,6-hexane triol, 1,2,4-butane triol, trimethylol ethane, pentaerythritol, quinitol, mannitol, sorbitol, methyl glycoside, diethylene glycol, triethylene glycol, tetraethylene glycol, dipropylene glycol, dibutylene glycol and the like.

In a preferred embodiment, the amine-initiated polyol of the invention is used as a mixture with at least one other polyether polyol that has an average functionality of from 4.5 to 7 hydroxyl groups per molecule and a hydroxyl equivalent weight of 100 to 175. The other polyether polyol may be, for example, a sorbitol- or sucrose/glycerine-initiated polyether. The amine-initiated polyol of the invention may constitute from 10 to 70% of the weight of the mixture in this case. Examples of suitable sorbitol- or sucrose/glycerine-initiated polyethers that can be used include Voranol® 360, Voranol® RN411, Voranol® RN490, Voranol® 370, Voranol® 446, Voranol® 520, Voranol® 550 and Voranol® 482 polyols, all available from Dow Chemical.

In another preferred embodiment, the amine-initiated polyol of the invention is used in a polyol mixture that also contains at least one other polyether polyol that has an average functionality of from 4.5 to 7 hydroxyl groups per molecule and a hydroxyl equivalent weight of 100 to 175, and which is not amine-initiated, and at least one other amine-initiated polyol having an average functionality of from 2.0 to 4.0 (preferably 3.0 to 4.0) and a hydroxyl equivalent weight of from 100 to 225. The other amine-initiated polyol may be initiated with, for example, ammonia, ethylene diamine, hexamethylenediamiane, diethanolamine, monoethanolamine, N-methyldiethanolamine, piperazine, aminoethylpiperazine, diisopropanolamine, monoisopropanolamine, methanolamine, dimethanolamine, toluene diamine (all isomers) and the like. Ethylene diamine- and toluene diamine-initiated polyols are preferred in this case. The polyol mixture may contain from 5 to 50% by weight of the amine-initiated polyol of the invention; from 20 to 70% by weight of the non-amine-initiated polyol and from 2 to 20% by weight of the other amine-initiated polyol. The polyol mixture may contain up to 15% by weight of still another polyol, which is not amine-initiated and which has a hydroxyl functionality of 2.0 to 3.0 and a hydroxyl equivalent weight of from 90 to 500, preferably from 200 to 500. Specific examples of polyol mixtures as just described include a mixture of from 5 to 50% by weight of the amine-initiated polyol of the invention, from 20 to 70% of a sorbitol or sucrose/glycerine initiated polyether polyol having an average functionality of from 4.5 to 7 hydroxyl groups per molecule and a hydroxyl equivalent weight of 100 to 175, from 2 to 20% by weight of an ethylenediamine-initiated polyol having an equivalent weight of from 100 to 225, and from 0 to 15% by weight of a non-amine-initiated polyol having a functionality of from 2.0 to 3.0 and hydroxyl equivalent weight of from 200 to 500.

Polyol mixtures as described can be prepared by making the constituent polyols individually, and then blending them together. Alternatively, polyol mixtures can be prepared by forming a mixture of the respective initiator compounds, and then alkoxylating the initiator mixture to form the polyol mixture directly. Such "co-initiated" polyols may be prepared using the aminocyclohexanealkylamine and another amine as the initiators, to form a blend of amine-initiated polyols. Combinations of these approaches can also be used.

The polyurethane-forming composition contains at least one organic polyisocyanate. The organic polyisocyanate or mixture thereof advantageously contains an average of at least 2.5 isocyanate groups per molecule. A preferred isocyanate functionality is from about 2.5 to about 3.6 or from about 2.6 to about 3.3 isocyanate groups/molecule. The polyisocyanate or mixture thereof advantageously has an isocyanate equivalent weight of from about 130 to 200. This is preferably from 130 to 185 and more preferably from 130 to 170. These functionality and equivalent weight values need not apply with respect to any single polyisocyanate in a mixture, provided that the mixture as a whole meets these values.

Suitable polyisocyanates include aromatic, aliphatic and cycloaliphatic polyisocyanates. Aromatic polyisocyanates are generally preferred. Exemplary polyisocyanates include, for example, m-phenylene diisocyanate, 2,4- and/or 2,6-toluene diisocyanate (TDI), the various isomers of diphenylmethanediisocyanate (MDI), hexamethylene-1,6-diisocyanate, tetramethylene-1,4-diisocyanate, cyclohexane-1,4-diisocyanate, hexahydrotoluene diisocyanate, hydrogenated MDI ($H_{12}$ MDI), naphthylene-1,5-diisocyanate, methoxyphenyl-2,4-diisocyanate, 4,4'-biphenylene diisocyanate, 3,3'-dimethoxy-4,4'-biphenyl diisocyanate, 3,3'-dimethyldiphenylmethane-4,4'-diisocyanate, 4,4',4"-triphenyl-methane diisocyanate, polymethylene polyphenylisocyanates, hydrogenated polymethylene polyphenyl polyisocyanates, toluene-2,4,6-triisocyanate and 4,4'-dimethyldiphenylmethane-2,2',5,5'-tetraisocyanate. Preferred polyisocyanates are the so-called polymeric MDI products, which are a mixture of polymethylene polyphenylene polyisocyanates in monomeric MDI. Especially suitable polymeric MDI products have a free MDI content of from 5 to 50% by weight, more preferably 10 to 40% by weight. Such polymeric MDI products are available from The Dow Chemical Company under the trade names PAPI® and Voranate®.

An especially preferred polyisocyanate is a polymeric MDI product having an average isocyanate functionality of from 2.6 to 3.3 isocyanate groups/molecule and an isocyanate equivalent weight of from 130 to 170. Suitable commercially available products of that type include PAPI™ 27, Voranate™ M229, Voranate™ 220, Voranate™ 290, Voranate™ M595 and Voranate™ M600, all from Dow Chemical.

Isocyanate-terminated prepolymers and quasi-prepolymers (mixtures of prepolymers with unreacted polyisocyanate compounds) can also be used. These are prepared by reacting a stoichiometric excess of an organic polyisocyanate with a polyol, such as the polyols described above. Suitable methods for preparing these prepolymers are well known. Such a prepolymer or quasi-prepolymer preferably has an isocyanate functionality of from 2.5 to 3.6 and an isocyanate equivalent weight of from 130 to 200.

The polyisocyanate is used in an amount sufficient to provide an isocyanate index of from 80 to 600. Isocyanate index is calculated as the number of reactive isocyanate groups provided by the polyisocyanate component divided by the number of isocyanate-reactive groups in the polyurethane-forming composition (including those contained by isocyanate-reactive blowing agents such as water) and multiplying by 100. Water is considered to have two isocyanate-reactive groups per molecule for purposes of calculating isocyanate index. A preferred isocyanate index is from 90 to 400 and a more preferred isocyanate index is from 100 to 150.

The blowing agent used in the polyurethane-forming composition includes at least one physical blowing agent which is a hydrocarbon, hydrofluorocarbon, hydrochlorofluorocarbon, fluorocarbon, dialkyl ether or fluorine-substituted dialkyl ethers, or a mixture of two or more thereof. Blowing agents of these types include propane, isopentane, n-pentane, n-butane, isobutene, isobutene, cyclopentane, dimethyl ether, 1,1-dichloro-1-fluoroethane (HCFC-141b), chlorodifluoromethane (HCFC-22), 1-chloro-1,1-difluoroethane (HCFC-142b), 1,1,1,2-tetrafluoroethane (HFC-134a), 1,1,1,3,3-pentafluorobutane (HFC-365mfc), 1,1-difluoroethane (HFC-152a), 1,1,1,2,3,3,3-heptafluoropropane (HFC-227ea) and 1,1,1,3,3-pentafluoropropane (HFC-245fa). The hydrocarbon and hydrofluorocarbon blowing agents are preferred. It is generally preferred to further include water in the formulation, in addition to the physical blowing agent.

Blowing agent(s) are preferably used in an amount sufficient such that the formulation cures to form a foam having a molded density of from 16 to 160 kg/m$^3$, preferably from 16 to 64 kg/m$^3$ and especially from 20 to 48 kg/m$^3$. To achieve these densities, the hydrocarbon or hydrofluorocarbon blowing agent conveniently is used in an amount ranging from about 10 to about 40, preferably from about 12 to about 35, parts by weight per 100 parts by weight polyol(s). Water reacts with isocyanate groups to produce carbon dioxide, which acts as an expanding gas. Water is suitably used in an amount within the range of 0.5 to 3.5, preferably from 1.5 to 3.0 parts by weight per 100 parts by weight of polyol(s).

The polyurethane-forming composition typically will include at least one catalyst for the reaction of the polyol(s) and/or water with the polyisocyanate. Suitable urethane-forming catalysts include those described by U.S. Pat. No. 4,390,645 and in WO 02/079340, both incorporated herein by reference. Representative catalysts include tertiary amine and phosphine compounds, chelates of various metals, acidic metal salts of strong acids; strong bases, alcoholates and phenolates of various metals, salts of organic acids with a variety of metals, organometallic derivatives of tetravalent tin, trivalent and pentavalent As, Sb and Bi and metal carbonyls of iron and cobalt.

Tertiary amine catalysts are generally preferred. Among the tertiary amine catalysts are dimethylbenzylamine (such as Desmorapid® DB from Rhine Chemie), 1,8-diaza (5,4,0) undecane-7 (such as Polycat® SA-1 from Air Products), pentamethyldiethylenetriamine (such as Polycat® 5 from Air Products), dimethylcyclohexylamine (such as Polycat® 8 from Air Products), triethylene diamine (such as Dabco® 33LV from Air Products), dimethyl ethyl amine, n-ethyl morpholine, N-alkyl dimethylamine compounds such as N-ethyl N,N-dimethyl amine and N-cetyl N,N-dimethylamine, N-alkyl morpholine compounds such as N-ethyl morpholine and N-coco morpholine, and the like. Other tertiary amine catalysts that are useful include those sold by Air Products under the trade names Dabco® NE1060, Dabco® NE1070, Dabco® NE500, Dabco® TMR-2, Dabco® TMR 30, Polycat® 1058, Polycat® 11, Polycat 15, Polycat® 33 Polycat® 41 and Dabco® MD45, and those sold by Huntsman under the trade names ZR 50 and ZR 70. In addition, certain amine-initiated polyols can be used herein as catalyst materials, including those described in WO 01/58976 A. Mixtures of two or more of the foregoing can be used.

The catalyst is used in catalytically sufficient amounts. For the preferred tertiary amine catalysts, a suitable amount of the catalysts is from about 1 to about 4 parts, especially from about 1.5 to about 3 parts, of tertiary amine catalyst(s) per 100 parts by weight of the polyol(s).

The polyurethane-forming composition also preferably contains at least one surfactant, which helps to stabilize the cells of the composition as gas evolves to form bubbles and expand the foam. Examples of suitable surfactants include alkali metal and amine salts of fatty acids, such as sodium oleate, sodium stearate sodium ricinolates, diethanolamine oleate, diethanolamine stearate, diethanolamine ricinoleate, and the like: alkali metal and amine salts of sulfonic acids such as dodecylbenzenesulfonic acid and dinaphthylmethanedisulfonic acid; ricinoleic acid; siloxane-oxalkylene polymers or copolymers and other organopolysiloxanes; oxethylated alkylphenols (such as Tergitol NP9 and Triton X100, from The Dow Chemical Company); oxyethylated fatty alcohols such as Tergitol 15-S-9, from The Dow Chemical Company; paraffin oils; castor oil; ricinoleic acid esters; turkey red oil; peanut oil; paraffins; fatty alcohols; dimethyl polysiloxanes and oligomeric acrylates with polyoxyalkylene and fluoroalkane side groups. These surfactants are generally used in amount of 0.01 to 6 parts by weight based on 100 parts by weight of the polyol.

Organosilicone surfactants are generally preferred types. A wide variety of these organosilicone surfactants are commercially available, including those sold by Goldschmidt under the Tegostab® name (such as Tegostab B-8462, B8427, B8433 and B-8404 surfactants), those sold by OSi Specialties under the Niax® name (such as Niax® L6900 and L6988 surfactants) as well as various surfactant products commercially available from Air Products and Chemicals, such as DC-193, DC-198, DC-5000, DC-5043 and DC-5098 surfactants.

In addition to the foregoing ingredients, the polyurethane-forming composition may include various auxiliary components, such as fillers, colorants, odor masks, flame retardants, biocides, antioxidants, UV stabilizers, antistatic agents, viscosity modifiers, and the like.

Examples of suitable flame retardants include phosphorus compounds, halogen-containing compounds and melamine.

Examples of fillers and pigments include calcium carbonate, titanium dioxide, iron oxide, chromium oxide, azo/diazo dyes, phthalocyanines, dioxazines, recycled rigid polyurethane foam and carbon black.

Examples of UV stabilizers include hydroxybenzotriazoles, zinc dibutyl thiocarbamate, 2,6-ditertiarybutyl catechol, hydroxybenzophenones, hindered amines and phosphites.

Except for fillers, the foregoing additives are generally used in small amounts, such as from 0.01 percent to 3 percent each by weight of the polyurethane formulation. Fillers may be used in quantities as high as 50% by weight of the polyurethane formulation.

The polyurethane-forming composition is prepared by bringing the various components together under conditions such that the polyol(s) and isocyanate(s) react, the blowing agent generates a gas, and the composition expands and cures. All components (or any sub-combination thereof) except the polyisocyanate can be pre-blended into a formulated polyol composition, if desired, which is then mixed with the polyisocyanate when the foam is to be prepared. The components may be preheated if desired, but this is usually not necessary, and the components can be brought together at about room temperature (~22° C.) to conduct the reaction. It is usually not necessary to apply heat to the composition to drive the cure, but this may be done if desired, too.

The invention is particularly useful in so-called "pour-in-place" applications, in which the polyurethane-forming composition is dispensed into a cavity and foams within the cavity to fill it and provide structural and/or thermal insulative attributes to an assembly. The nomenclature "pour-in-place" refers to the fact that the foam is created at the location where it is needed, rather than being created in one step and later assembled into place in a separate manufacturing step. Pour-in-place processes are commonly used to make appliance products such as refrigerators, freezers, and coolers and similar products which have walls that contain thermal insulation foam. The presence of the amine-initiated polyol in the polyurethane-forming composition tends to provide the formulation with good flow and short demold times, while at the same time producing a low k-factor foam.

The walls of appliances such as refrigerators, freezers and coolers are most conveniently insulated in accordance with the invention by first assembling an outer shell and in interior liner together, such that a cavity is formed between the shell and liner. The cavity defines the space to be insulated as well as the dimensions and shape of the foam that is produced. Typically, the shell and liner are bonded together in some way, such as by welding, melt-bonding or through use of some adhesive (or some combination of these) prior to introduction of the foam formulation. The shell and liner may be supported or held in the correct relative positions using a jig or other apparatus. One or more inlets to the cavity are provided, through which the foam formulation can be introduced. Usually, one or more outlets are provided to allow air in the cavity to escape as the cavity is filled with the foam formulation and the foam formulation expands.

The materials of construction of the shell and liner are not particularly critical, provided that they can withstand the conditions of the curing and expansion reactions of the foam formulation. In most cases, the materials of construction will be selected with regard to specific performance attributes that are desired in the final product. Metals such as steel are commonly used as the shell, particularly in larger appliances such as freezers or refrigerators. Plastics such as polycarbonates, polypropylene, polyethylene styrene-acrylonitrile resins, acrylonitrile-butadiene-styrene resins or high-impact polystyrene are used more often to make the shells for smaller appliances (such as coolers) or those in which low weight is important. The liner may be a metal, but is more typically a plastic as just described.

The foam formulation is then introduced into the cavity. The various components of the foam formulation are mixed together and the mixture introduced quickly into the cavity, where the components react and expand. It is common to pre-mix the polyol(s) together with the water and blowing agent (and often catalyst and/or surfactant as well) to produce a formulated polyol. The formulated polyol can be stored until it is time to prepare the foam, at which time it is mixed with the polyisocyanate and introduced into the cavity. It is usually not required to heat the components prior to introducing them into the cavity, nor it is usually required to heat the formulation within the cavity to drive the cure, although either or both of these steps may be taken if desired. The shell and liner may act as a heat sink in some cases, and remove heat from the reacting foam formulation. If necessary, the shell and/or liner can be heated somewhat (such as up to 50° C. and more typically 35-40° C.) to reduce this heat sink effect, or to drive the cure.

Enough of the foam formulation is introduced such that, after it has expanded, the resulting foam fills those portions of the cavity where foam is desired. Most typically, essentially the entire cavity is filled with foam. It is generally preferred to "overpack" the cavity slightly, by introducing more of the foam formulation than is minimally needed to fill the cavity, thereby increasing the foam density slightly. The overpacking provides benefits such as better dimensional stability of the foam, especially in the period following demold. Generally, the cavity is overpacked by from 4 to 20% by weight. The final foam density for most appliance applications is preferably in the range of from 28 to 40 kg/m$^3$.

After the foam formulation has expanded and cured enough to be dimensionally stable, the resulting assembly can be "demolded" by removing it from the jig or other support that is used to maintain the shell and liner in their correct relative positions. Short demold times are important to the appliance industry, as shorter demold times allow more parts to be made per unit time on a given piece of manufacturing equipment.

Demold times can be evaluated as follows: A 28-liter "jumbo" Brett mold coated with release agent is conditioned to a temperature of 45° C. 896 g±4 g of a foam formulation is injected into the mold in order to obtain a 32 kg/m$^3$ density foam. After a period of 6 minutes, the foam is removed from the mold and the thickness of the foam is measured. After a further 24 hours, the foam thickness is re-measured. The difference between the thickness after 24 hours and the initial thickness is an indication of the post-demold expansion of the foam. The demold time is considered to be sufficiently long if the post-demold expansion is no more than 4 mm on this test.

As mentioned, flow is another important attribute of the foam formulation. For purposes of this invention, flow is evaluated using a rectangular "Brett" mold, having dimensions of 200 cm×20 cm×5 cm (~6'6"×8"×2"). The polyurethane-forming composition is formed, and immediately injected into the Brett mold, which is oriented vertically (i.e., 200 cm direction oriented vertically) and preheated to 45±5° C. The composition is permitted to expand against its own weight and cure inside the mold. The amount of polyurethane-forming composition is selected such that the resulting foam just fills the mold. The density of the resulting foam is then measured and compared with the density of a free-rise foam made from the same formulation (by injecting the formulation into a plastic bag or open cardboard box where it can expand freely vertically and horizontally against atmospheric pressure). The ratio of the Brett mold foam density to the free rise density is considered to represent the "flow index" of the formulation. With this invention, flow index values are typically below 1.8, and are preferably from 1.2 to 1.5.

The polyurethane foam advantageously exhibits a low k-factor. The k-factor of a foam may depend on several variables, of which density is an important one. For many applications, a rigid polyurethane foam having a density of from 28.8 to 40 kg/m$^3$ (1.8 to 2.5 pounds/cubic foot) exhibits a good combination of physical properties, dimensional stability, and cost. Foam in accordance with the invention, having a density within that range, preferably exhibits a 10° C. k-factor of no greater than 22, preferably no greater than 20, and more preferably no greater than 19.5 mW/m-° K. Higher density foam may exhibit a somewhat higher k-factor.

In addition to the appliance and thermal insulation foams described above, the invention is also useful to produce vehicle noise dampening foams, one or more layers of a laminated board, pipe insulation and other foam products. The invention is of special interest when a rapid cure is wanted, and or good thermal insulating properties are wanted in the foam.

If desired, the process of the invention can be practiced in conjunction with the methods described, for example, in WO 07/058793, in which the reaction mixture is injected into a closed mold cavity which is at a reduced pressure.

The following examples are provided to illustrate the invention, but are not intended to limit the scope thereof. All parts and percentages are by weight unless otherwise indicated.

EXAMPLE 1

A mixture of the cis- and trans-isomers of isophorone diamine (from Sigma-Aldrich, Gillingham, UK) (5015 g, 29.5 moles) is added to a glass reactor purged with nitrogen, and heated to 125° C. The flask is pressurized to ~4500 kPa with propylene oxide, and the pressure maintained until a total of 5133 g (88.4 mole) of propylene oxide is fed to the flask. The reaction is then allowed to digest for two hours at 125° C., after which 79.4 g of a 45% potassium hydroxide solution in water is added. The water is removed under vacuum at 115° C., and the reactor is again heated to 125° C. More propylene oxide is fed into the reactor at a rate of 30 g/minute until an additional 4356 g (75 mol) of propylene oxide is added. The reaction is then allowed to digest again for 2 hours, at which time 56.7 g of an 70% solution of acetic acid in water is added. The resulting polyol has a hydroxyl number of 440 mg KOH/g (corresponding to a hydroxyl equivalent weight of 127.5) and a hydroxyl functionality of close to 4.0. The polyol has a viscosity of 23,800 centipoises at 50° C.

EXAMPLE 2

Rigid polyurethane foam is produced from the components described in Table 1. Foam processing is performed using a Hi Tech CS-50 high pressure machine operated at a throughput of 175-225 g/s. The foam formulation is injected into a bag (to measure free rise density) and into a vertical Brett mold which is preheated to 45° C. Component temperatures prior to mixing are ~21° C.

TABLE 1

| Component | Parts By Weight |
|---|---|
| Sorbitol-initiated polyol[1] | 57.0 |
| Polyol of Example 1 | 15.6 |
| Ethylene diamine-initiated polyol[2] | 11.0 |
| Poly(propylene oxide) diol[3] | 10.0 |
| Water | 2.4 |
| Silicone surfactant | 2.0 |
| Amine Catalysts | 2.0 |
| Cyclopentane | 14.0 |
| Polymeric MDI[4] (index) | 144 (115 index) |

[1]A 6.0 functional poly(propylene oxide) having a hydroxyl number of 482, commercially available as Voranol ® RN 482 polyol from Dow Chemical.
[2]A poly(propylene oxide) having a hydroxyl number of 500, commercially available as Voranol ® RA 500 polyol from Dow Chemical.
[3]A diol having a molecular weight of about 400, commercially available as Voranol ® P400 polyol from Dow Chemical.
[4]Voranate ™ M229 polymeric MDI, available from Dow Chemical.

The composition has a cream time of 3.5 seconds, a gel time of 33 seconds and a tack-free time of 41 seconds. The free rise density is 22.28 kg/m$^3$, and the minimum fill density is 32.1 kg/m$^3$. The flow index is therefore 1.441. The foam has an average compressive strength of 145.62 kPa.

K-factor is measured on 8"×1"×1" (20×2.5×2.5 cm) samples using a Laser Comp Fox 200 device, with an upper cold plate temperature of 10° C. and a lower warm plate temperature of 38° C., and found to be 19.15 mW/m-° K.

What is claimed is:

1. A process for preparing a rigid polyurethane foam, comprising
   a) forming a reactive mixture containing at least
      1) a mixture of an amine-initiated polyol that has a functionality of 3.7 to 4.0, a hydroxyl equivalent weight of from 100 to 130 and which is a reaction product of 1,8-diamino-p-menthane and a $C_2$-$C_4$ alkylene oxide with at least one polyether polyol having a functionality of from 4.5 to 7 and a hydroxyl equivalent weight of 100 to 175, provided that such a mixture contains at least 5% by weight of the amine-initiated polyol;
      2) at least one hydrocarbon, hydrofluorocarbon, hydrochlorofluorocarbon, fluorocarbon, dialkyl ether or fluorine-substituted dialkyl ether physical blowing agent; and
      3) at least one polyisocyanate;
      wherein the reactive mixture further contains water, and
   b) subjecting the reactive mixture to conditions such that the reactive mixture expands and cures to form a rigid polyurethane foam.

2. The process of claim 1, wherein the reaction mixture further contains at least one different amine-initiated polyol having an average functionality of from 2.0 to 4.0 and a hydroxyl equivalent weight of from 100 to 225.

3. The process of claim 2, wherein the reaction mixture further contains a non-amine-initiated polyol having a functionality of from 2.0 to 3.0 and a hydroxyl equivalent weight of from 90 to 500.

4. A rigid polyurethane foam made in accordance with claim 1.

5. The foam of claim 4, which is an appliance insulation foam, a layer of a laminated board, pipe insulation or a vehicle dampening member.

6. A polyol mixture comprising:
   a) from 10 to 50%, based on the combined weights of components a), b), c) and d), of an amine-initiated polyol that has a functionality of 3.7 to 4.0, a hydroxyl equivalent weight of from 100 to 130 and which is a reaction product of 1,8-diamino-p-menthane and a $C_2$-$C_4$ alkylene oxide;
   b) from 20 to 70%, based on the combined weights of components a), b), c) and d), of a non-amine-initiated polyether polyol having an average functionality of from 4.5 to 7 and a hydroxyl equivalent weight of from 100 to 175;
   c) from 2 to 20%, based on the combined weights of components a), b), c) and d), of another amine-initiated polyol, different from component a), which has an average functionality of from 2.0 to 4.0 and a hydroxyl equivalent weight of from 100 to 225 and
   d) from 0 to 15%, based on the combined weights of components a), b), c) and d), of a non-amine-initiated polyol having a functionality of from 2.0 to 30 and a hydroxyl equivalent weight of from 200 to 500.

* * * * *